ns
3,590,105
Patented June 29, 1971

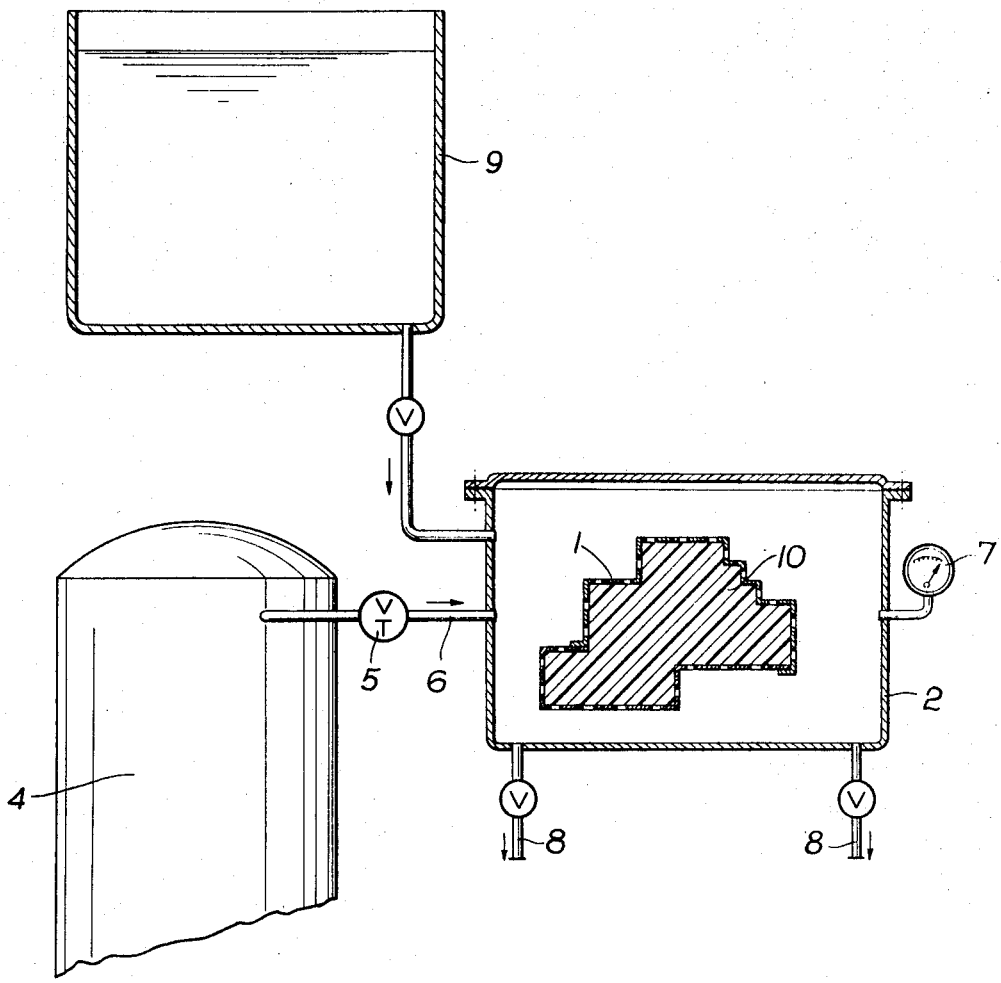

3,590,105
METHOD OF MANUFACTURE OF A FOAMED POLYSTYRENE BODY
Peter Keller, Dachau, near Munich, Germany
Filed Oct. 3, 1967, Ser. No. 672,432
Int. Cl. B29d 27/04
U.S. Cl. 264—48                                    2 Claims

ABSTRACT OF THE DISCLOSURE

A method of the manufacture of a foamed polystyrene body having a hard surface which comprises the steps of placing polystyrene containing a foaming agent in a mold, then feeding steam at a pressure of 5 to 10 atmospheres into the mold until a pressure of 2 to 5 atmospheres is obtained therein. The pressure is then reduced in the mold immediately to less than 1.5 atmospheres and then kept at this value for approximately 30 to 120 seconds.

---

The present invention relates to a method of the manufacture of foamed polystyrene bodies having a hard surface, in general, and of such foamed polystyrene bodies in which the polystyrene, containing a foaming agent and preferably pre-expanded, is expanded and hardened in closed molds into which steam is fed, in particular.

It is known to prepare polystyrene containing a foaming agent under the action of heat. According to the degree of expansion there are obtained molded articles of lower or higher specific gravity, in which only slight variations in density can be detected in the interior of the articles. In the case of insulating plates, packaging members and some other articles, uniform density does not matter, and may even be desired. In contrast, other molded articles, for example floats, window frames, doors and other articles for various uses, must be provided with a hard outer layer, so that the articles are not damaged by surface pressures that are to be expected when the article is in use (e.g. the pressure of finger nails). In these cases, the molded bodies have in the past either been made of basically uniformly high density, or been coated after manufacture with a lacquer or other coating material.

In the foaming processes previously used (steam injection processes), steam at 105° C. to 125° C. is blown into a perforated mold, the final pressure in the steam chambers amounting to 0.8 to 1.5 atmospheres. When higher steam temperature or pressures are used, the surface of the foamed material undergoes undesired burning. The foamed polystyrene melts and the surface collapses non-uniformly. Molded bodies having such a surface are unusable and are treated as waste.

It is one object of the present invention to provide a method of the manufacture of foamed polystyrene bodies by which the outer layers are compressed to form a smooth, very hard surface of high density.

It is another object of the present invention to provide a method of the manufacture of foamed polystyrene bodies by producing, from steam at 5 to 10 atmospheres, a pressure of 2 to 5 atmospheres in the mold within 10 seconds, the pressure thereupon being reduced to 0 to 1.5 atmospheres both being above atmospheric pressure and being kept at this value for approximately one minute.

By means of this method, the polystyrene containing a foaming agent is first expanded more rapidly than at lower steam pressures and becomes very hot and plastic, particularly in the vicinity of the wall of the mold. Owing to the very high internal pressure and high temperature the plastic foam is pressed outwardly onto the hot wall of the mold, with continuous reduction of the internal density, and is there highly but uniformly compressed. A uniform surface is obtained only if the steam pressure, and hence the temperature, in the mold is reduced to the extent that with the high internal expansion pressure persisting the plastification of the outer layers stops increasing and the plastic foam is pressed against the wall of the mold and is, thereby, smoothed without the exterior becoming overheated and collapsing.

This method makes it possible to manufacture foamed polystyrene articles, the outer layers of which are 10 to 20 times as dense as the inner core.

With these and other objects in view, which will become apparent in the following detailed description, the present invention will be clearly understood in connection with the accompanying drawing in which the only figure is a schematic flow diagram showing a vertical cross-section of a mold and a steam chamber in elevation.

EXAMPLE

Polystyrene pre-expanded to 100 kg./m.$^3$ is placed in a highly perforated mold 1 for a window frame, the mold being provided with a steam chamber 2 which envelopes the mold. Then the mold is closed firmly, but not so as to be gas-tight, and steam at 8 atmospheres above atmospheric pressure is fed into the steam chamber 2 by opening a throttle valve 5 until a manometer 7 connected to the steam chamber 2 indicates a pressure of 3 atmospheres. About 5 seconds elapse from the opening of the steam valve 5 until the attainment of this pressure. Then the steam valve 5 is partially closed quickly, until the manometer 7 indicates a pressure of 1.0 atmospheres above atmospheric pressure. This pressure is then maintained for 1 minute. Thereupon the steam valve is closed and, with outlets for condensate open, cooling water from a container 9 is fed into the steam chamber 2. After 5 minutes the molded body 10 thus formed has cooled down to the extent that it can be removed from the mold.

Tests have shown that similar results can be obtained, if polystyrene which has not been pre-expanded, is used. All pressures stated above are given in atmospheres above atmospheric pressure.

While I have disclosed one embodiment of the present invention, it is to be understood that this embodiment is given by example only and not in a limiting sense, the scope of the present invention being determined by the objects and the claims.

I claim:
1. A method of the manufacture of a foamed polystyrene body having a hard surface, comprising the steps of
   placing a plastic foam granular material comprising polystyrene containing a foaming agent in a mold,
   plasticizing and rapidly expanding said plastic foam material particularly in the vinicity of the wall of the mold pressing said plastic foam material outwardly onto the heated wall of said mold with continuous reduction of the internal density thereby greatly and uniformly compressing said plastic foam material against the wall of said mold by feeding steam at a pressure of 5 to 10 atmospheres above atmospheric pressure into said mold until a first pressure within the range of 2 to 5 atmospheres above atmospheric pressure is obtained therein for about 10 seconds, and
   subjecting the plastic foam material to plastification, terminating an increase of the plastification of the plastic foam material adjacent said wall of said mold while continuing a high internal expansion pressure, whereby said plastic foam material is pressed against the wall of the mold and is smoothed producing a uniform exterior surface of greater density than the interior without the exterior surface becoming overheated and collapsing, reducing the pressure in the mold to between atmospheric pres- sure to 1.5 atmospheres above atmospheric pressure upon reaching said first pressure, and maintaining the pressure at this value for approximately 30 to 120 seconds.

2. The method, as set forth in claim 1, which includes the step of
pre-expanding said polystyrene prior to placing the latter into said mold.

References Cited

UNITED STATES PATENTS

| | | | |
|---|---|---|---|
| 3,015,851 | 1/1962 | Wiles | 264—53 |
| 3,058,162 | 10/1962 | Grabowski | 264—53 |
| 3,086,248 | 4/1963 | Culp | 264—53 |
| 3,278,658 | 10/1966 | Immel | 264—51 |

FOREIGN PATENTS

| | | | |
|---|---|---|---|
| 263,380 | 7/1968 | Austria | 264—48 |
| 1,889,521 | 11/1963 | Germany | 264—45 |

OTHER REFERENCES

Stastny, Fritz: "Styropor—New Porous Synthetic," pp. 1–13, translation of: ("Styropor—Ein Neuartiger, Poroser Kunststoff" BASF reprint from Kunststoffe, 44 (1954), No. 4, pp. 173–180, and No. 5, pp. 221–226).

PHILIP E. ANDERSON, Primary Examiner

U.S. Cl. X.R.

18—5; 264—51, 234